United States Patent [19]

Moczygemba et al.

[11] 3,910,868

[45] Oct. 7, 1975

[54] INCREASING INHERENT VISCOSITY OF COPOLYMERS

[75] Inventors: George A. Moczygemba; Henry L. Hsieh, both of Bartlesville, Okla.

[73] Assignee: Phillips Petroleum Company, Bartlesville, Okla.

[22] Filed: Mar. 1, 1974

[21] Appl. No.: 447,426

[52] U.S. Cl. ...... 260/89.5 S; 260/45.95; 260/88.3 A
[51] Int. Cl.$^2$ .......................................... C08F 27/00
[58] Field of Search ...... 260/88.3 A, 89.5 A, 89.5 S

[56]  References Cited
UNITED STATES PATENTS
3,435,014  3/1969  Scherf et al. .................. 260/89.5 S

*Primary Examiner*—Harry Wong, Jr.

[57] ABSTRACT

The inherent viscosity of halooxirane-methacrylate copolymers is increased to produce semi-solid rubbery copolymers by treating said copolymers with an organolithium treating agent.

9 Claims, No Drawings

INCREASING INHERENT VISCOSITY OF COPOLYMERS

BACKGROUND

The invention relates to a method for increasing the inherent viscosity of halooxirane-methacrylate copolymers.

As usually synthesized, halooxirane-methacrylate copolymers are viscous liquids. The materials required for their synthesis are generally available; however, these copolymers are of limited value because they are liquids. Solid or semi-solid halooxirane-methacrylate copolymers are characterized as rubbery copolymers and as such they are suitable for molding or other type of forming processes. In addition such rubbery copolymers can be used for blending with other rubbers. Therefore the value and usefulness of these copolymers could be substantially increased if these liquid copolymers could easily be converted into solid or semi-solid rubbery copolymers.

It is an object of the invention to produce solid or semi-solid, rubbery copolymers.

Another object of the invention is to produce halooxirane-methacrylate copolymers of a semi-solid, rubbery character.

Other aspects, objects, and advantages of the invention will be apparent to those skilled in the art upon studying the specification and the appended claims.

SUMMARY

In accordance with the invention, the inherent viscosity of halooxirane-methacrylate copolymers is increased by treating said copolymers with an organolithium treating agent wherein the lithium functionality is at least 2.

DETAILED DESCRIPTION OF THE INVENTION

The invention is applicable broadly to liquid halooxirane-methacrylate copolymers. The copolymers are treated after the polymerization process but either prior to or after isolation of the polymer. For example the copolymer, having been made and isolated earlier, can be redissolved in a suitable solvent and treated with the treating agent, or the treating step can be an adjunct to the polymerization process by adding the treating agent after polymerization of the monomers but before isolation of the copolymer. Also, with respect to the treatment prior to isolation, the treating agent can be added to the polymerization mixture either before or after the polymerization initiator is inactivated.

Organolithium compounds suitable for use as treating agents in accordance with the invention include single compounds and mixtures of two or more compounds that have the formula $RLi_x$, wherein R is a hydrocarbon radical selected from the group consisting of aliphatic, cylcloaliphatic and aromatic radicals and combinations thereof, such as aralkyl and alkaryl, and $x$ is an integer of at least 2. Generally $x$ is an integer of 2 to 6. The R in the formula has a valence equal to the integer and preferably contains from 1 to 20 carbon atoms, although higher molecular weight compounds can be utilized. Examples of suitable organolithium compounds wherein $x$ is an integer of 2 to 4 include dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,3-bis(1-lithio-3-methypentyl)benzene, 1,5-dilithionaphthalene, 1,2-dilithio-1,2-diphenylethane, 1,4-dilithio-2,5-dimethylbenzene, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, and 1,2,3,5-tetralithio-4-hexylanthracene.

Other suitable organolithium treating agents are the alphalithio multi-substituted dialkylbenzenes and corresponding oligomers such as those represented by the formula

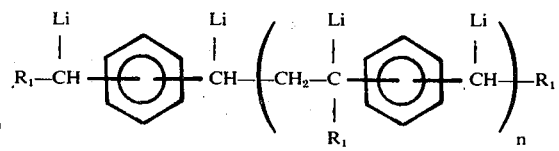

wherein $R_1$ is a linear or branched alkyl containing 2 to 12 carbon atoms, and $n$ is an integer of 0 to about 2. These compounds are usually used as a mixture in a suitable solvent; however, the mixture is primarily 1,3-bis(1-lithio-3-methylpentyl)benzene, referred to hereinafter as DiLi-3. Additional information regarding such compounds can be found in U.S. Pat. No. 3,668,263, Morrison et al (1972) and U.S. Pat. No. 3,776,964, Morrison et al (1973).

The quantity of treating agent employed can vary broadly, but the amount of treating agent generally ranges from about 1 to about 100, preferably from about 5 to about 50 gram milliequivalents of lithium per hundred grams of the copolymer.

Generally, the treating step is accomplished over a broad range of reaction conditions. Usually the temperature is in the range of from about −50° to 250°C and for a period of from about 5 minutes to 50 hours. Preferably, however, the temperature is in the range of from about −25°C to 100°C and for a period of from about 10 minutes to 24 hours.

The treating agent is normally dissolved in a solvent prior to treating the copolymer. Suitable solvents include paraffinic, cycloparaffinic, and aromatic hydrocarbons containing from about 4 to 10 carbon atoms per molecule. Exemplary solvents include pentane, decane, hexane, cyclopentane, cyclohexane, methylcyclohexane, benzene, toluene, xylene, ethylbenzene and mixtures thereof. If it is desired to increase the reactivity of the treating agent, a small amount of a polar organic solvent can be employed as a supplementary diluent. A tertiary alkyl amine or an ether is employed for this purpose. Examples of such include trimethylamine, tri-n-propylamine, N-methyldiethylamine, triethylamine, N,N-dimethylcyclohexylamine, diethyl ether, ethyl-n-propyl ether, di-n-octyl ether, diphenyl ether, tetrahydrofuran, dioxane and the like. The quantity of such polar organic supplementary diluents suitable in a given instance is readily determined through routine experimentation in view of the reactivity of the treating agent, the degree of inherent viscosity increase desired, and other such factors.

The halooxirane monomers used to produce the copolymers treated as per the invention are generically represented by the formula

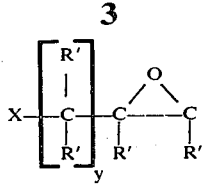

In this generic formula, X is chlorine, bromine or fluorine with y being an integer from 1 through 6. The total number of carbon atoms per molecule ranges up to and including about 20 with the range of 3 to 10 being preferred. The R''s are the same or different and are hydrogen or alkyl, cycloalkyl, or aryl radicals or combinations thereof, including alkylaryl and aralkyl. Some or all of the R''s can be halogen substituted. Examples of such compounds include 1-chloro-2,3-epoxypropane; 1-bromo-5,6-epoxyhexane; 1-chloro-3-phenyl-7,8-epoxyoctane; 1-bromo-4,5-epoxyeicosane; and 3-bromo-5-cyclohexyl-6,7-epoxyheptane.

The methacrylate monomers used to produce suitable copolymers are generally represented by the formula

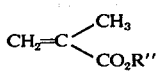

wherein R'' is a linear or branched alkyl hydrocarbon radical with from about 1 to 6 carbon atoms per radical. Examples of some suitable methacrylates are methyl methacrylate, n-propyl methacrylate, isobutyl methacrylate, n-hexyl methacrylate and 3-methylpentyl methacrylate.

Generally the quantity of methacrylate present in the monomer mixture ranges from about 1 to 50, preferably from 10 to 40, parts by weight per 100 parts by weight of total monomer mixture.

The initiators employed to polymerize the monomer mixture as known in the art are usually formed by combining at least one organoaluminum compound and at least one triorganophosphine compound. The organoaluminum compounds are represented by the formula

wherein each R''' is an alkyl, cycloalkyl or aryl radical, containing from 1 to 20 carbon atoms, $n$ is an integer from 1 to 3, $m$ is an integer from 0 to 2, and $n + m$ equals 3. Examples of these compounds include trimethylaluminum, triethylaluminum, tri-n-propylaluminum, triisopropylaluminum, tri-n-butylaluminum, triisobutylaluminum, triisoamylaluminum, tri-n-hexylaluminum, tri-n-octylaluminum, tri-n-dodecylaluminum, tricyclohexylaluminum, triphenylaluminum, tribenzylaluminum, trieicosylaluminum, diethyl-n-butylaluminum, tri-4-tolylaluminum, tri(2-hexyltetradecyl)aluminum, methyldi(4-cyclohexyloctyl)aluminum, ethyldi(2-butylcyclohexyl)aluminum, tri(2,4,8-trimethylhendecyl)aluminum, isopropylaluminum dihydride, n-nonylaluminum dihydride, 4-methylcyclohexylaluminum dihydride, 2,4,6-triethylphenylaluminum dihydride, 3,5,7-tri-n-propylhendecylaluminum dihydride, diethylaluminum hydride, di(2,4,6-trimethylhexyl)aluminum hydride, methyl(benzyl)aluminum hydride, di-tert-butylaluminum hydride, dieicosylaluminum hydride and mixtures thereof.

The triorganophosphine compounds are represented by the formula

wherein $R^{IV}$ is the same as R''' and, in addition, the hydrocarbon radicals can contain alkoxy substituents. Examples of these compounds include trimethylphosphine, triisopropylphosphine, tri-n-hexylphosphine, tri-n-octylphosphine, ethyldi-n-tridecylphosphine, trieicosylphosphine, methyl(dicyclopentyl)phosphine, triphenylphosphine, tribenzylphosphine, tri(4-methoxyphenyl)phosphine, tri(3,5-diethoxyphenyl)phosphine, tri(5-methoxypentyl)phosphine and mixtures thereof.

The amount of initiator employed, which is conveniently expressed on the basis of the organoaluminum compound in the initiator system, varies over a broad range. As a general rule, such amount of initiator is maintained within the range of from about 1 to about 100 gram millimoles of organoaluminum compound per 100 grams of monomer being polymerized, with particularly good results being obtained in the range of from about 5 to 40 gram millimoles of organoaluminum compound per 100 grams of monomer. It is noted that the amount of catalyst is based on the total amount of monomer. The mole ratio of organoaluminum compound to triorganophosphine compound is in the range of from about 1:1 to 20:1, with particularly good results being obtained in the range of from about 1:1 to 10:1. Mixtures of more than one of each of the catalyst components can be employed.

The polymerization reaction is conducted either as a batch or as a continuous process with the catalyst being added as a single initial charge or in increments during the polymerization. The catalyst system is prepared by mixing the two components and charging the resulting material to the reactor. As an alternative, the catalyst components can be charged separately. Similarly, the monomers are introduced into the reaction zone as one charge or gradually during the polymerization. In order to improve the efficiency of the polymerization reaction, it is generally preferred that the reaction be conducted in the presence of an inert diluent. Suitable diluents which can be used for this purpose include paraffinic, cycloparaffinic, and aromatic hydrocarbons containing from about 4 to 10 carbon atoms per molecule. Exemplary diluents which can be used are pentane, hexane, decane, cyclopentane, cyclohexane, methylcyclohexane, benzene, toluene, xylene and ethylbenzene. Mixtures of two or more diluents can be used.

The temperature and pressure at which the polymerization reaction is effected can vary over a wide range. The temperature is generally within the range of from about −50 to 200°C, preferably in the range of from about −25 to 100°C. Polymerization is usually conducted at a pressure which will maintain the materials substantially completely in the liquid state. The duration of the reaction depends primarily on temperature, pressure, and the activity of the particular catalyst being used. Usually the polymerization is conducted for a period of from about 5 minutes to 100 hours or more. A preferred range is from about 10 minutes to 50 hours.

Various materials are known to be detrimental to the polymerization initiators and treating agents described above. These detrimental materials include carbon dioxide, oxygen and water. It is usually desirable, therefore, that the reactants and initiators be freed of these materials as well as other materials which may tend to inactivate the initiators. Furthermore, it is desirable to remove air and moisture from the reaction vessel in which the polymerization is to be conducted. Upon completion of the polymerization and the inventive postpolymerization treatment, the resulting mixture is then processed to inactivate the initiator and to recover the rubbery copolymer. A suitable method for accomplishing this result involves steam stripping the diluent from the copolymer. In another suitable method, a catalyst-inactivating material, such as an alcohol, is added to the mixture so as to inactivate the initiator and cause precipitation of the copolymer. The copolymer is then separated from the alcohol and diluent by any suitable means, such as decantation or filtration. It has been found to be advantageous to add an antioxidant, such as 2,6-di-t-butyl-4-methylphenol, to the polymer solution prior to recovery of the copolymer. Alternatively, as discussed above, the inventive treatment can be applied after isolation of the copolymer as herein described.

The rubbery semi-solid copolymers produced in accordance with the process of the invention have utility in applications where low temperature flexibility, heat and ozone resistance, and resistance to swelling in the presence of hydrocarbons and hydrocarbon derivatives are important. The fabrication of articles, such as automobile body mounts, motor mounts, automobile suspension system parts, hoses, and tubing is anticipated from the rubbery solid copolymers.

EXAMPLE I

Two runs were made, as control runs, wherein the inventive postpolymerization treatment was omitted. The runs were made in accordance with the following recipe. The results are shown in Table I.

| Recipe | Parts by Weight |
|---|---|
| Toluene | 430 |
| Epichlorohydrin | 70 |
| Methyl methacrylate, Run 1; Ethyl acrylate, Run 2 | 30 |
| Tri-n-octylphosphine | 4 mhm[1] |
| Triisobutylaluminum | 30 mhm |
| Polymerization temperature, °C | 5 |
| Polymerization time, hours | 18 |

[1]Gram millimoles per hundred grams monomer

The polymerizations were carried out under nitrogen in capped beverage bottles employing anhydrous reactants and conditions. The charge order was that in which the polymerization mixture components are listed above. A nitrogen purge followed the addition of toluene. The bottles were tumbled in a constant temperature bath for the stipulated polymerization times and at the stipulated temperatures. Following polymerization, 2,6-di-t-butyl-4-methylphenol (1 part by weight per hundred parts of monomer) was added in a 50/50 volume toluene/isopropyl alcohol solution, the copolymer solutions were filtered, and the copolymers were coagulated by adding the filtrates to isopropyl alcohol. The copolymers were then collected by filtration and dried at reduced pressure. Copolymers thus produced were characterized as viscous liquids.

TABLE I

Control Run Data

| Run No. | ECH[1] g. | Acrylate Compound | g. | Polymer Yield g. | IV[2] | Gel Wt. %[3] |
|---|---|---|---|---|---|---|
| 1 | 7.1 | MMA[4] | 3.0 | 5.9 | 0.37 | 6 |
| 2 | 7.1 | EA[5] | 3.1 | 10.6 | 0.17 | 9 |

[1]Epichlorohydrin (1.18 g/ml)
[2]Inherent viscosity determined in accordance with U.S. 3,278,508, column 20, note a with the modification that tetrahydrofuran was used in place of toluene and with the further modification that the solution was not filtered through a sulfur absorption tube but rather a sample of the solution was filtered through a fritted glass filter stick of grade C porosity and pressured directly into the viscometer.
[3]Gel content, as weight percent, determined in accordance with U.S. 3,278,508, column 20, note b with the modification that tetrahydrofuran was used in place of toluene.
[4]Methyl methacrylate (0.94 g/ml)
[5]Ethyl acrylate (0.93 g/ml)

EXAMPLE II

Four additional runs were made wherein the inventive post-polymerization treatment was illustrated employing a multilithium agent, DiLi-3, which was primarily 1,3-bis(1-lithio-3-methylpentyl)benzene; see Bulletin 192, Lithium Corporation of America, Subsidiary of Gulf Resources and Chemical Corporation, Bessemer City, N.C. 28016. The runs were made in accordance with the following recipe. The results are shown in Table II.

| Recipe | Parts by Weight |
|---|---|
| Polymerization | |
| Toluene | 430 |
| Epichlorohydrin | 70 |
| Methyl methacrylate, Runs 1 and 2; | |
| Ethyl acrylate, Runs 3 and 4 | 30 |
| Tri-n-octylphosphine | 4 mhm |
| Triisobutylaluminum | 30 mhm |
| Polymerization temperature, °C | 5 |
| Polymerization time, hours | 18 |
| Postpolymerization Treatment | |
| Treating agent — DiLi-3 in a mixture of n-hexane and triethylamine) | variable |
| Reaction temperature, °C | 70 |
| Reaction time, hours | 5 |

The polymerization procedure was the same as that in Example I. The inventive postpolymerization treatment was followed by the polymer isolation steps described in Example I.

TABLE II

| Run No. | ECH g. | Acrylate Compound | g. | Yield of Treated Polymer g. | DiLi-3 meqhm[1] | IV | Gel Wt. % |
|---|---|---|---|---|---|---|---|
| 1 | 7.1 | MMA | 3.0 | 9.0 | 8.5 | 0.51 | 5 |
| 2 | 7.1 | MMA | 3.0 | 9.7 | 42.5 | 0.55 | 8 |
| 3 | 7.1 | EA | 3.1 | 10.6 | 8.5 | 0.15 | 6 |
| 4 | 7.1 | EA | 3.1 | 10.8 | 42.5 | 0.19 | 4 |

[1]Gram milliequivalents per hundred grams monomer

The copolymers produced in runs 1 and 2 were semi-solid and rubbery; however runs 3 and 4 indicated that the ethyl acrylate-containing copolymers remained viscous liquids and did not respond to the inventive process. In comparing runs 1 and 2 of Table II with the runs of Table I, the inherent viscosity of the copolymers produced in accordance with the invention was considerably higher. It is also noted that the gel content of the copolymers is not significantly effected by the inventive process.

What is claimed is:

1. A method for increasing the inherent viscosity of a liquid halooxirane-methacrylate copolymer wherein the copolymer is formed from 1. a halooxirane monomer represented by the formula

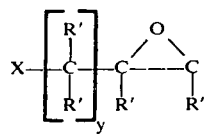

wherein X is chlorine, bromine, or fluorine, $y$ is an integer from 1 to 6, each R' is hydrogen or an alkyl, cycloalkyl, or aryl radical or halogenated form thereof, each R' can be the same or different, and the total number of carbon atoms per molecule can be about 20, and 2. a methacrylate monomer represented by the formula

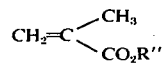

wherein R'' is a linear or branched alkyl hydrocarbon radical with from about 1 to 6 carbon atoms per radical, said method comprising:

treating the copolymer in the presence of a suitable solvent with an organolithium treating agent wherein said treating agent is an organolithium compound represented by the general formula $RLi_x$, or a mixture of two or more said compounds, wherein x is an integer from 2 to 6, R is a hydrocarbon radical selected from the group consisting of aliphatic, cycloaliphatic, and aromatic radicals of from about 1 to 20 carbon atoms per radical, the valence of R is equal to the integer $x$.

2. The method of claim 1 wherein the copolymer is treated with the treating agent after the copolymer is formed by copolymerization but before the copolymer is isolated.

3. The method of claim 2 wherein the copolymer is treated with the treating agent after the copolymer is isolated and dissolved in a suitable solvent.

4. The method of claim 3 wherein the amount of said treating agent is in the range of from about 1 to 100 gram milliequivalents of lithium per 100 grams of copolymer, and the copolymer is treated with the treating agent for a period in the range of from about 5 minutes to 50 hours and at a temperature in the range of from about −50° to 250°C.

5. The method of claim 4 wherein the amount of said treating agent is in the range of from about 5 to 50 gram milliequivalents of lithium per 100 grams of copolymer, and the copolymer is treated with the treating agent for a period in the range of from about 10 minutes to 24 hours and at a temperature in the range of from about −25°C to 100°C.

6. The method of claim 5 wherein the treating agent is dissolved in a solvent, or a mixture of two or more solvents selected from the group consisting of paraffinic, cycloparaffinic, and aromatic hydrocarbons containing from about 4 to 10 carbon atoms per molecule.

7. The method of claim 6 wherein the reactivity of the treating agent is increased by dissolving the treating agent in a polar organic solvent selected from the group consisting of a tertiary alkyl amine or an ether.

8. The method of claim 7 wherein the treating agent is a solution of alpha-lithio multi-substituted dialkylbenzene and corresponding oligomers.

9. The method of claim 8 wherein the copolymer is an epichlorohydrin methyl methacrylate copolymer the treating agent is primarily 1,3-bis(1-lithio-3-methylpentyl)benzene, and the solvent is toluene.

* * * * *